United States Patent Office 3,547,590
Patented Dec. 15, 1970

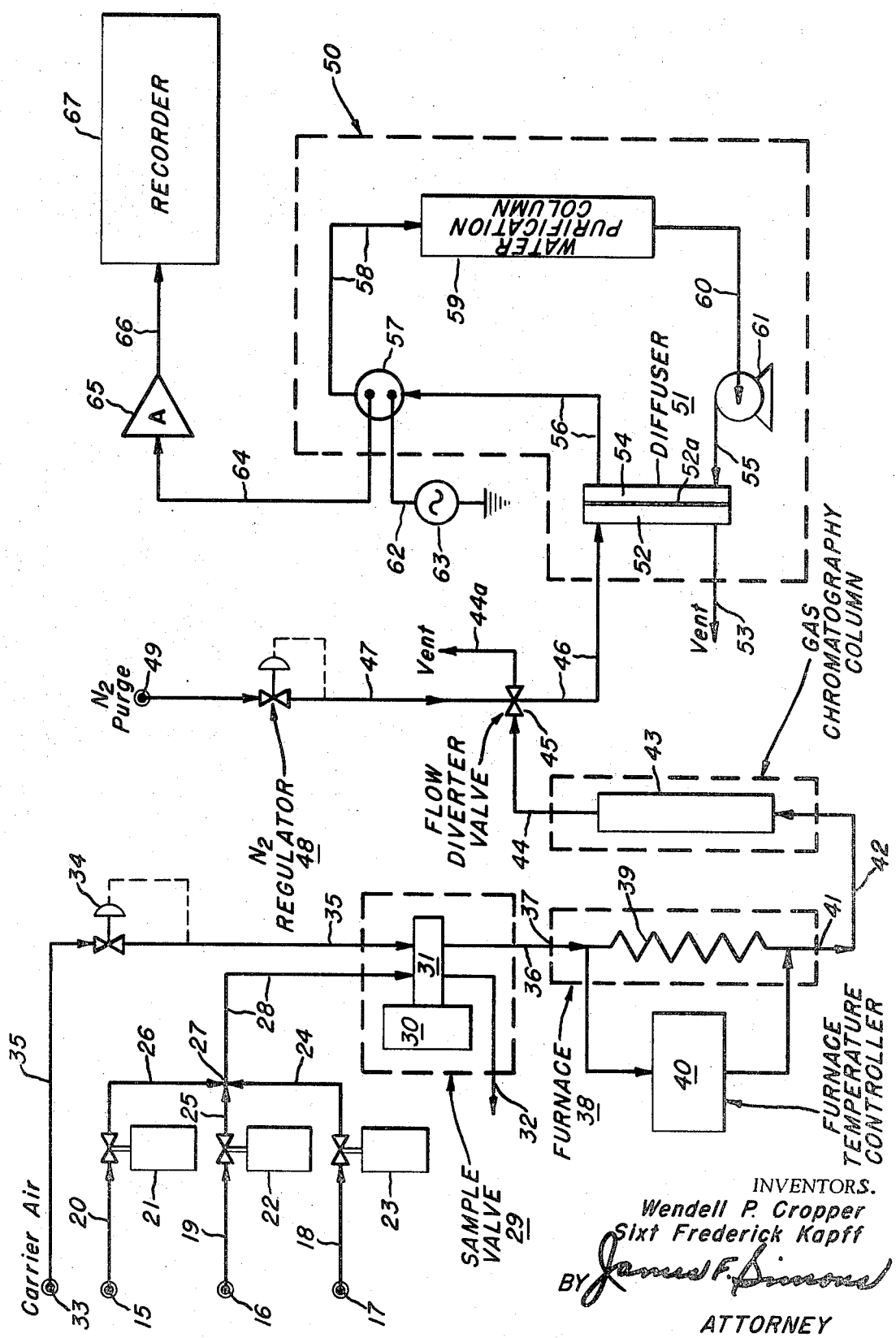

3,547,590
SULFUR DETECTING METHOD AND APPARATUS
Wendell P. Cropper, Lansing, and Sixt Frederick Kapff, Homewood, Ill., assignors to Standard Oil Company (Indiana), Chicago, Ill., a corporation of Indiana
Filed Dec. 26, 1967, Ser. No. 693,647
Int. Cl. G01n 27/10, 31/06, 31/12
U.S. Cl. 23—253
9 Claims

ABSTRACT OF THE DISCLOSURE

An apparatus for detecting and measuring sulfur in a hydrocarbon sample from a desulfurizer or the like comprising, a combustion means, means for introducing the sample into the combustion means, means for separating sulfur dioxide from the products of the combustion means, means for transferring $SO_2$ to a water stream, and conductivity measuring means for determining the amount of sulfur contained in the sample.

BACKGROUND OF THE INVENTION

For many years problems have existed in the monitoring, measuring and control of sulfur levels in the effluent streams of desulfurizers. The establishment of control of the amount of sulfur contained in a broad range of distillate fuels such as heater oils, furnace oils, etc. has never been efficient. In the past individual samples have been drawn off, carried to a laboratory for testing to determine the amount of sulfur present therein and finally the data was sent to the process operator who then performed the required operating adjustments in accordance with that indicated by the laboratory data. This type of sampling and testing involved undesirable time lags between the withdrawal of a sample and the reception of the test by the operator of the process.

Often the test data obtained indicated a sulfur level present in the distillate stream in excess of that required by specification or the sulfur level was far below that desired. In either event inefficient production occurred and because of the normally incident time lag large amounts of product outside the specifications were often produced. Where the sulfur level was too high it was necessary to rework the product, and where the sulfur level was too low additional costs were incurred in unnecessarily producing a product below the desired specification.

With the recent increased government and public interest in the conservation of environmental resources, the rapid and accurate measurement and determination of sulfur levels in distillate streams is of great importance in the furtherance of these conservation efforts.

Accordingly, it has now been found that a relatively simple, inexpensive and highly dependable apparatus and method can accurately and continuously detect and measure the sulfur content of hydrocarbon feed streams particularly the distillate fuel streams from a desulfurizer. This rapid apparatus and method for detecting sulfur level eliminates the long time lags inherent in the art. Consequently, process variables can be adjusted in a short time to prevent the production of off-spec materials, thus, eliminating the waste and additional costs of production which formerly existed when laboratory methods for testing were employed.

The prior art exemplifies various methods for monitoring, detecting and measuring concentrations of minor components in petroleum and chemical products; however, none of the known art appears to suggest nor render obvious the claimed subject matter of this invention.

SUMMARY OF THE INVENTION

This invention relates to the detecting and measuring of specific constituents in hydrocarbon streams. More specifically, the invention concerns method and apparatus for detecting the presence of and measuring the amount of undesirable materials in hydrocarbon streams. The novel apparatus and method of this invention detects and accurately measures the sulfur level present in hydrocarbon distillate streams from desulfurizers.

The apparatus includes combustion means for burning a hydrocarbon sample, means for introducing the sample into the combustion means, means for separating sulfur dioxide from the products of the combustion means, and detecting means including means for transferring sulfur dioxide to a water stream and conductivity measuring means for determining the amount of sulfur content in the sample. The combustion means includes a combustion zone having accurately controlled temperatures which generally range from about 1,750° F. to about 2,000° F. The heat is produced by a furnace surrounding the combustion zone and the temperatures are controlled by a furnace temperature controller.

Means for introducing the sample into the combustion means includes a sample receiving means communicating with a sample valve which gathers a measured amount of sample from the sample receiving means. The sample valve also includes a carrier stream such as air under pressure sufficient to move the sample through the system.

The combustion means is connected downstream to a means for separating sulfur dioxide from the products of the combustion means. The means for separating the sulfur dioxide from the products of the combustion means can be operated at a temperature of about 210° F.; however, the temperature can be at any level required for the separation of the particular product involved within the parameters of the programmed system.

The detecting means includes means for transferring sulfur dioxide to a water stream which communicates with the means for separating sulfur dioxide. The means for transferring sulfur dioxide to the water stream can be characterized as a diffuser having a first zone and a second zone separated by a membrane. The sulfur dioxide is transferred to the water by diffusion through the membrane. The water containing sulfur dioxide is transferred from the second zone to the conductivity measuring means.

The detecting means also includes conductivity measuring means for determining the amount of sulfur contained in the sample which is connected to the second zone of the sulfur dioxide transfer means. The conductivity measuring means includes a source of alternating current connected to a conductivity cell, an amplifier for amplifying the alternating current, and a recorder having a rectifier to convert the alternating current signal to a direct current signal, to record the conductivity of the water containing sulfur dioxide.

The operating conditions and characteristics of a system having the aforementioned structural elements are not critical except within the parameters of its program of operation. For instance, the size of the sample may vary in accordance with the capacity of the apparatus. Combustion zone sizes and temperatures depend upon the sizes of the sample and sample constituents since complete combustion is required. The means for separating sulfur dioxide from the products of the combustion means may be any size and operated under any conditions of temperature and pressure, etc., to control the elution of materials that interfere with detection and measurement such as carbon dioxide in the instant principal embodiment.

The novel method of this invention includes introducing a sample to be tested into a combustion zone, effectuating complete combustion in the combustion zone, separating system-interfering materials from the combustion product, transferring the material to be tested to a water stream, and measuring the material contained in the water.

BRIEF DESCRIPTION OF THE DRAWING

The attached drawing is a flow diagram of the process representing essential elements with the necessary detail.

DESCRIPTION OF A PREFERRED EMBODIMENT

Numerals 15, 16 and 17 designate sources of materials to be tested. Lines 18, 19 and 20 carry the materials to be tested to electrically actuated valves 21, 22 and 23. Lines 24, 25 and 26 communicate with line intersection 27. Line 28 communicates from line intersection 27 to sample valve means 29. The sample valve means 29 has diaphragm housing 30 and slider housing 31. Loop line 32 communicates with line 28 and extends back to the process or the source of the sample. Carrier air source 33 communicates with sample valve 29 through control valve 34 via line 35.

Sample introduction line 36 connects the sample valve means with the furnace inlet 37 of furnace 38. The combustion means including the furnace 38 has combustion zone 39 with furnace temperature controller 40 connected to it. Combustion zone outlet 41 is connected to line 42 which communicates with the means for separating carbon dioxide which has a gas chromatography column numerically designated 43.

Line 44 is connected from column 43 to flow diverter valve 45. Flow diverter valve 45 has vent line 44a and nitrogen line 47 which communicates through nitrogen regulator valve 48 to nitrogen purge source 49. From the flow diverter valve 45, line 46 connects with the diffuser 51, specifically with the first zone 52. First zone 52 of diffuser 51 has vent line 53. Diffuser 51 also has a second zone 54 with water inlet line 55. The second zone 54 of diffuser 51 has outlet line 56 connecting with conductivity cell 57. Line 58 connects the conductivity cell with water purification column 59 and the outlet line 60 connects the water purification column with pump 61.

Cell 57 is electrically connected from line 62 with alternating current source 63. Cell 57 is also electrically connected through line 64 with amplifier 65, and line 66 electrically connects the amplifier with the recorder 67.

In operation, when a sample is introduced into the system from any number of sources such as 15, 16 or 17 through any one of the lines 18, 19 or 20, the electrically actuated valve such as 21, 22 or 23 permits the sample to pass through the line intersection 27 and line 28 and into the sample valve means 29 where the return loop line 32 returns the unused material to its source.

The sample valve means can be any one of the well-known devices. For example, housing 30 can house a pneumatically actuated diaphragm which is connected to a sampling slider within housing 31 which in accordance with a programmed analytical cycle, the slider captures the required amount of sample flowing through the valve means via lines 28 and 32. The sample will be transferred by the slider within housing 31 to line 36 where carrier air from source 33 is passed via line 35 through valve 34 actuated by the programmed system and the air under sufficient pressure to function properly moves the sample through inlet 37 and into the combustion zone 39 of the combustion means.

The combustion means includes furnace 38 which surrounds the combustion zone 39 where temperatures are accurately controlled in order to have heat sufficient to promote complete combustion. The furnace temperature controller can include a power source and thermocouple for resistance heating to ensure the existence of the temperature required to obtain complete combustion.

The combustion products from the combustion zone are moved out the outlet 41 through line 42 and into the means for separating carbon dioxide from the remaining combustion products. The removal can be effectuated in a gas chromatography column where the carbon dioxide is eluted therefrom through line 44, flow diverter valve 45 and vent line 44a. The apparatus is so programmed in order to remove all interfering carbon dioxide from the system, and the flow diverter valve functions in accordance with the program for the analytical cycle.

After the elution of the carbon dioxide through flow diverter valve 45 and vent line 44a, the flow diverter valve changes position so that sulfur dioxide and other combustion products which do not interfere with the detecting means 50 of the system are transported via line 44 through flow diverter 45 and line 46 to the first zone 52 of the diffuser 51. The diffuser is a means for transferring sulfur dioxide to a pure water stream flowing through the second zone 54 from water purification column 59 via line 60 and pump 61.

When the sample is a hydrocarbon distillate, the combustion products from the combustion means are essentially carbon dioxide, sulfur dioxide and water. After the combustion products pass through the means for separating carbon dioxide such as a gas chromatography column, the elution and removal of carbon dioxide from the system leaves essentially sulfur dioxide and water which are transported into the first zone 52 of the means for transferring sulfur dioxide. The combustion products pass through the first zone 52 and are removed from the diffuser 51 through vent line 53. Simultaneously, a pure water stream is passing through the second zone 54 separated from the first zone 52 by membrane 52a.

Merely by illustration and not by way of limitation, an example of the operation of the diffuser 51 is as follows. Hydrocarbon combustion products less carbon dioxide and water simultaneously enter the cell in adjacent zones separated by the membrane 52a. The sample and water are on opposite sides of the membrane 52a simultaneously as they pass through their respective zones. The water soluble sulfur dioxide or any other like gases are diffused through the membrane 52a from the combustion products passing through zone 52. The rates of flow of the gases and water are controlled in accordance with the analytical scheme. The membrane may be of denitrated nitrocellulose or Teflon, or any other similarly suitable material.

The water containing sulfur dioxide is carried via line 56 from the second zone 54 of the diffuser 51 to the conductivity cell 57. The conductivity cell and recorder mechanism are well-known in the art, consequently, a detailed description is considered unnecessary. Broadly, the alternating current power source 63 transmits power through conductor 62 to the conductivity cell 57 where the water containing sulfur dioxide conducts a current and an alternating current signal is transmitted through conductor means 64 to amplifier 65 and via line 66 to the recorder 67 where recording occurs. The water containing the sulfur dioxide passes from conductivity cell 57 to water purification column 59 via line 58. The water so purified leaves column 59 through line 60, pump 61, and line 55 for re-entry into the second zone 54 of the diffuser 51.

Throughout the operation of the system, except when the flow diverter valve 45 directs the sulfur dioxide containing combustion gases from line 44 into line 46, the nitrogen purge gas from source 49 is directed through valve 48, line 47, valve 45, and line 46 to purge them of all materials. The nitrogen purge gas is also directed through zone 52 and is vented through line 53. The flow diverter valve 45 is so constructed and programmed that it allows the purging of line 46 and zone 52 even during the elution and venting of carbon dioxide from the system at valve 45 and vent 44a. In this manner, the system remains clean and only the desired materials from the particular sample to be tested are present in the lines and zone 52.

Similarly, the carrier air from source 33, which can be instrument air, is free of any soluble materials that could interfere with the accurate operation of the system. The carrier air is directed through the system in sufficient amounts and under sufficient pressure to supply the necessary initial motive force to the sample being tested.

The means for separating carbon dioxide from the products out of the combustion means can, as previously mentioned, utilize a gas chromatography column. The column can employ a standard silica gel packing. Certainly, the conditions selected should be those most desirable to obtain rapid elution and a short analytical cycle. Also, complete separation of the carbon dioxide and the sulfur dioxide is necessary and rapid elution of sulfur dioxide allows additional time for the switching of the flow diverter valve 45 to direct the sulfur dioxide containing combustion gases into the first zone 52 of the diffuser 51.

The following example illustrates the operation of this novel method and apparatus for detecting the presence of sulfur in a hydrocarbon distillate sample. A line such as line 20 was tapped into a feed stream from a desulfurizer and a five microliter sample was collected by sampling valve 29 and introduced to the combustion zone 39 having a temperature of about 1,800° F. The combustion zone length was about five feet and the carrier air flow rate was about 850 cubic centimeters per minute. The combustion products were transferred to the gas chromatography column containing a standard silicagel. The column temperature was about 210° F. and the length of the column was about 1.5 feet. The analysis time was about three minutes and the recorder portrayed the sulfur level of the sample introduced.

The temperature in the combustion zone of the combustion means may be at least as low as 1,750° F. and the temperature may range up to at least about 2,000° F. The temperature should be sufficient to effectuate complete combustion of the sample. The carrier air flow rate may vary widely depending upon the size of the system and the programming of it. The instrument is effective in measuring the sulfur content in a hydrocarbon sample at levels as low as 0.01 percent and the upper level of the sulfur content in the hydrocarbon sample is not limited by this invention. If the instrument is so designed it is effective in measuring sulfur contained in a sample in amounts at least as high as 15% or more.

The utilization of this novel method and apparatus is particularly suitable for the petroleum and chemical industries, such as, in laboratory testing, in monitoring the distillates out of a disulfurizing, at pipeline terminals, or at any location where the measurement of a particular measurable constituent is desired.

This invention is described by reference to the specific embodiment defined and claimed herein; however, it is understood that the embodiments are not intended to limit the scope of the invention, but these embodiments are presented only to teach the best modes contemplated for practising this invention.

Having thus described the invention, what is claimed is:

1. Apparatus for easuring the concentration of sulfur in a hydrocarbon sample, including:
   combustion means where the sample is burned;
   purifying means where system-interferring gases are removed from the products of combustion;
   diffusing means where water soluble sulfur-containing compounds are separated from the products of combustion and dissolved in a stream of water;
   means for introducing the sample into the combustion means;
   means for interconnecting the combustion means, purifying means, and diffusing means, so that the products of combustion flow from the combustion means into the purifying means and then into the diffusing means; and
   conductivity cell means into which the stream of water containing the sulfur compounds flow, said conductivity cell means providing an output signal calibrated to correspond to the sulfur concentration in said stream.

2. The apparatus of claim 1, including recorder means which is actuated in response to the output signal of the conductivity cell means.

3. The apparatus of claim 1 additionally including water purifying means which removes sulfur-containing compounds from the stream of water after leaving the conductivity cell means, said purified water being recycled to the diffusing means.

4. The apparatus of claim 1 wherein the purifying means for removing system-interfering gases includes a gas chromatography column.

5. The apparatus of claim 1 wherein the diffuser means includes means for purging said diffusing means with an inert gas.

6. The apparatus of claim 1 wherein the combustion means includes means for controlling temperature during combustion of the sample.

7. Apparatus for measuring the concentration of sulfur in a combustible sample, including:
   diffusing means having first and second chambers separated by a membrane which allows sulfur-containing gases to diffuse therethrough;
   combustion means where the sample is burned having an inlet for the sample and an outlet connected to the first chamber of the diffusing means to that products of combustion flow into the diffusing means with the sulfur-containing gases present in the products of combustion diffusing through the membrane into the second chamber;
   means coupled to the second chamber for introducing water into said second chamber so that the sulfur-containing gases dissolve in the water;
   means coupled to the second chamber for withdrawing therefrom water and dissolved gases; and
   conductivity cell means into which the water and dissolved gases flow, said conductivity cell means providing an output signal calibrated to correspond to the sulfur concentration in said water.

8. The apparatus of claim 7 wherein purifying means are connected between the diffusing means and combustion means for removing system-interferring gases from the products of combustion.

9. The apparatus of claim 7 additionally including water purifying means which removes dissolved gases from the water after leaving the conductivity cell means, said purified water being recycled to second chamber of the diffusing means.

References Cited

UNITED STATES PATENTS

| | | | |
|---|---|---|---|
| 2,949,345 | 8/1960 | Clauss | 23—254X |
| 3,114,609 | 12/1963 | Jones | 23—230 |
| 3,237,380 | 3/1966 | Barrett | 55—67 |

OTHER REFERENCES

Hoggan et al.: Anal. Chem. 34, #8, July 1962, pp. 1019 to 1023 relied on.

MORRIS O. WOLK, Primary Examiner

R. M. REESE, Assistant Examiner

U.S. Cl. X.R.

23—230